INVENTOR
ROBERT A. FRYKLUND
BY Robert F. O'Connell
ATTORNEY

May 5, 1964 R. A. FRYKLUND 3,132,341
RADIO NAVIGATION AID
Filed Oct. 31, 1960 3 Sheets-Sheet 2

BOSTON—NEW-YORK AREA

INVENTOR
ROBERT A. FRYKLUND
BY Robert F. O'Connell
ATTORNEY

May 5, 1964   R. A. FRYKLUND   3,132,341
RADIO NAVIGATION AID
Filed Oct. 31, 1960   3 Sheets-Sheet 3

BOSTON-PROVIDENCE AREA

MASSACHUSTTS BAY
CAP COD BAY

APPROACH TO NORWOOD AIRPORT

INVENTOR
ROBERT A. FRYKLUND

BY Robert F. O'Connell
ATTORNEY

United States Patent Office 3,132,341
Patented May 5, 1964

3,132,341
RADIO NAVIGATION AID
Robert A. Fryklund, Dedham, Mass., assignor to Raytheon Company, Lexington, Mass., a corporation of Delaware
Filed Oct. 31, 1960, Ser. No. 65,996
16 Claims. (Cl. 343—112)

This invention relates to a novel radio aid for use in navigation. The purpose of this system is to provide an aid in navigation in the form of information presenting continuous position data relative to a plurality of fixed radio transmitting stations. In general, the system of the invention is based upon radio-direction-finding techniques, and the information is presented or displayed upon a cathode-ray tube over which is superimposed a transparent map to show the location of the craft with respect to the fixed radio stations.

An object of the invention is to provide bearing information which may be obtained automatically by direction finding techniques from a plurality of fixed radio transmitting stations.

A further object of the invention is to provide a computing system for processing bearing data obtained from two radio stations and displaying the results as two bearing-indicating lines on a cathode-ray tube, the intersection of such lines indicating the position of the vehicle upon a transparent map overlay placed above the cathode-ray tube.

An additional object of the invention is to provide a continuous display and tracking system whereby the location of a vehicle with respect to fixed radio transmitting stations may be traced as such vehicle progresses across the field of a display map.

A more specific object of the invention is to provide automatic electronic equipment mounted upon a vehicle for furnishing navigational data or assistance, such equipment being of a minimum complexity and cost, which will produce or provide the effect of a plurality of navigational "fixes."

A further specific object of the invention is to provide a cathode-ray tube display system for navigational data in the form of bearing information from two fixed radio stations, which information may be continuously or periodically corrected and stabilized despite movements of the vehicle upon which the display system is carried. Stabilization of the display may be with respect to a fixed or north azimuth, or with respect to a fixed relative azimuth direction, such as the longitudinal center line of the vehicle or a fixed heading upon which the vehicle is travelling.

The equipment of the present invention automatically performs a sequence of steps which a human navigator would do if he were to obtain the position fix from two radio transmitting stations, that is:

(1) Take a bearing with radio-direction-finder equipment from a first radio transmitting station;
(2) Translate such bearing on a chart by drawing a bearing line from the radio transmitting station;
(3) Take a second bearing upon another station;
(4) Translate the second bearing on the chart by drawing a second line from the second transmitting station; and
(5) Determining the position or "fix" of the vehicle at the intersection of the two lines upon the chart.

The above sequence is performed electronically thirty times per second in the preferred embodiment of the invention. Therefore, the position fix so-obtained appears to be continuous, and the progress of the vehicle may be observed as it moves on the face of the chart.

The system of the present invention is based upon the well-known techniques of geometric triangulation, and for this reason no scale factor or calibration problems are presented. The transparent overlay maps used with the cathode-ray tube may be of any convenient scale, and require merely that at least two usable fixed radio transmitting stations be identifiable upon the overlay. The rest of the overlay or chart may contain as much of the topographical features of the terrain as is desired.

An important advantage of the system of the present invention is that it may be readily combined with existing navigational aids in the use of their fixed transmitting stations, but at the same time it presents a less complicated and more workable arrangement. The nature of the navigational information produced by the present invention is similar to that in several prior art radio navigational aids. Certain advantages in weight, volume, simplicity, and cost are afforded over known systems, even through the complete information available may be less sophisticated than that of the more complex arrangements.

An additional feature of the present invention is the provision of the automatic display of the bearing information on an overlay map so that the operator of the vehicle need not relay upon a time-consuming manual transfer of the bearing fix information to a supplementary chart.

A further advantage of this invention lies in the fact that the equipment would be particularly effective for short-range navigation of aircraft. Thus the system of the invention can be used to indicate the position of an aircraft on a chart with respect to a runway at an airport if two small fixed localizer transmitters are provided, one on each side of the airport runway. With the additional provision of a sensitive altimeter on the aircraft, a simplified instrument approach and/or glide path landing system may thus be provided.

The above and further objects, advantages, and features of the present invention will become readily apparent to those skilled in the art upon consideration of the detailed description of preferred embodiments of such invention, when taken with the accompanying drawings, wherein.

Figure 1:
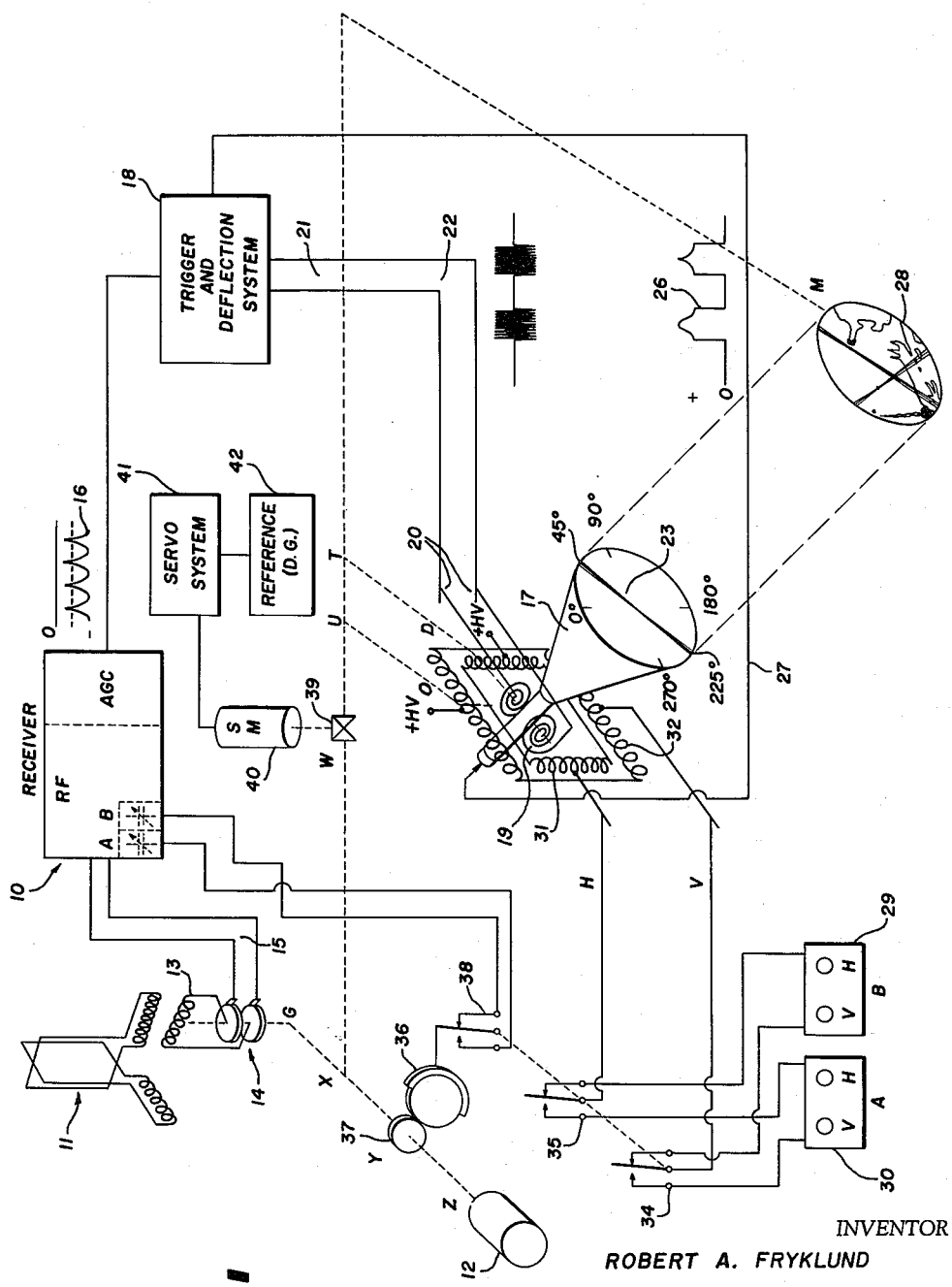
FIGURE 1 is a schematic diagram, partially in block form, showing the components of the system of the invention.

In FIGURE 1, a direction finder receiver 10 is used to obtain radio bearing signals from a plurality of fixed radio transmitting stations. Any of the well-known forms of directional antennas may be used for the input to the receiver to obtain the bearing of the transmitting station. A rotating loop may be used, although in the preferred embodiment of the invention a fixed crossed loop and goniometer search coil system, as indicated generally at 11, is used. The loop antenna or goniometer coil is rotated at a high speed by means of a drive motor 12. The output of the goniometer coil 13 is connected by means of the brush and slip ring connections 14 to the input leads 15 of the receiver. Receiver 10 is designed to have a strong AGC action, and the AGC voltage varies as the directional pattern of the antenna system is rotated in azimuth, passing through two minimums or "nulls" for each revolution. These nulls occur when the antenna directional pattern is effectively at right angles to the transmitting station to which the equipment is tuned. The resultant AGC voltage waveform will be indicated at 16 at the receiver output, and such waveform will be considered in greater detail in connection with FIGURES 2 through 5.

The speed of rotation of the drive motor 12 is of minor importance except for the consideration of flicker, and the visual persistence of both the operator and of the cathode-ray tube 17 upon which the bearing indication is displayed. A convenient motor speed for use is 1800 revolutions per minute or 30 per second. When the antenna directivity pattern is rotated at this speed, two nulls will be passed through for each revolution, and waveform 16, which shows the AGC voltage versus antenna rotation, may thus be a series of pulses at a repetition rate of 60 p.p.s., with such pulses appearing at fixed azimuthal positions of the antenna system. The bearing information is displayed upon the face of cathode-ray tube 17 under the control of the trigger and deflection system contained within the block element 18 which interconnects receiver 10 and the display tube. A rotating deflection coil 19 of the type similar to that used in PPI display systems is utilized, and it is designed to operate at high rotational speeds. Coil 19 is driven by the drive motor 12 as indicated by the dotted-line mechanical interconnection ZTD in angular synchronism with the antenna drive. Deflection coil 19 is connected through the brushes, indicated schematically at 20, to a high frequency deflection drive source within the block element 18. In the preferred embodiment, the high frequency may be 100 kc., and such deflection drive source is controlled in turn by the AGC voltage waveform 16 from the receiver as described hereinafter. The resultant drive energy for the deflection coils is thus a pulsed waveform 22 which energizes the leads 21 and therefore the coil 19 at each repetitive occurrence as the antenna pattern passes through a null to sweep the electron pattern rapidly across the face of the cathode-ray tube.

The periphery of tube 17 is calibrated in an azimuth circle, and as the system operates, a bright line will be traced upon the tube screen to represent the azimuthal relationship between the transmitting station and the receiving antenna. Both the receiving and transmitting antennas are located on such line, and they have a geographical-directional relationship to one another as indicated by the angle at which the line is traced upon the screen. As shown in FIGURE 1, the transmitter is located somewhere upon the line 23, but whether at 45 degrees or at 225 degrees cannot be determined due to the ambiguity of the antenna pattern.

The location of the receiving antenna will be at the center of the cathode-ray tube face, and the line traced upon the face will be divergent from the origin location of the transmitting antenna due to the fact that deflection coil 19 and the antenna 11 are rotating as the cathode beam is deflected diametrically on the tube face. The breadth of the fanlike divergence at the two peripheries depends upon the sharpness of the null, and such sharpness is, in turn, dependent upon the received signal strength and the AGC action within the receiver 10. A sharp null will produce a narrower fan and thus a line of reduced divergence and increased accuracy for locating the origin of the distant transmitting antenna.

In order to improve the sharpness of the display presentation the AGC voltage 16 may be applied to a suitable threshold or trigger circuit within the deflection system of block element 18. A suitable threshold circuit, for example, one which would trigger another pulse upon each occurrence of the AGC voltage rising above the threshold level, may be provided in accordance with known principles. If the threshold level is set as indicated at the dashed line 24 in FIGURE 2 wherein the AGC voltage is plotted vertically and the antenna rotation is plotted horizontally, suitable pulses may be derived each time that waveform 16 passes above the level 24. Each derived pulse, for example, the pulses 16' and 16" shown in FIGURE 4, will have a width or duration which is proportional to the time that the waveform 16 is above the threshold level. Such threshold level may be varied either manually or automatically, the principal object being to obtain the narrowest possible pulse from the AGC null.

Figure 4:
Figure 5:

Although in radio-direction-finding practice, the null may be somewhat obscured by noise which will tend to broaden or flatten the peak, in every instance when the null is present and appears above the threshold level a trigger pulse will be produced. Such pulse will tend to be symmetrically distributed in time duration or width about the virtual null location which is as indicated by the line 25 in FIGURES 3 through 5. Thus, referring to FIGURE 3, a broad null occurs in waveform 16 at the zero degree and 180 degree positions, and the resultant pulse produced thereby is as indicated at 16' in FIGURE 4 having a substantial width. For sharper nulls in the waveform 16, a narrower pulse 16" will be produced as indicated at the 360 degree position in FIGURE 4. In order to improve the accuracy of the display, the cathode-ray tube 17 is modulated by a combination of the pulses as present in the waveforms of FIGURES 3 and 4. The rectangular pulses 16' or 16" of FIGURE 4 are used to unblank the tube 17, and on top of such pulses are combined the AGC null voltage pulses which appear above the threshold line 24. These are the pulses 16''' and 16'''', respectively, of FIGURE 3. The resultant combination pulses formed within block element 18 are as shown in FIGURE 5. Such combined pulses will have the effect of modulating the intensity of the electron beam as it is deflected diametrically upon the tube face by the coils 19 while being concurrently rotated angularly as such coils are rotated by the drive motor 12. Therefore, the display, as traced by the line 23 upon the tube face, will have a bright center line and the readability will be improved for the observer. The combined pulses of FIGURE 5 will produce the waveform 26 as indicated on FIGURE 1 and they are applied over the lead 27 to intensity-modulate tube 17.

A transparent map overlay 28 is placed over the face of the cathode-ray tube, and is so oriented that the map compass directions agree with the azimuth circle upon the tube face. On such map 28 the known position of various radio transmitting stations is indicated as well as sufficient pertinent terrain data for the use of the observer-navigator. The transmitting frequencies of such stations, and the true altitude thereof would normally be included in such data.

Figure 6:
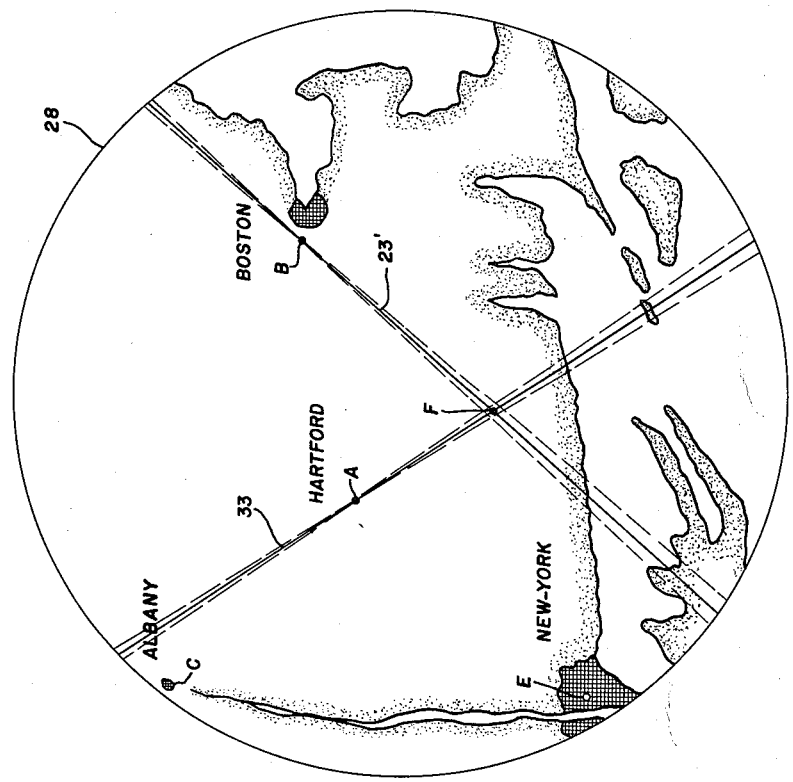
FIGURE 6 is an enlarged representation of the map overlay shown in FIGURE 1.
Figure 2:
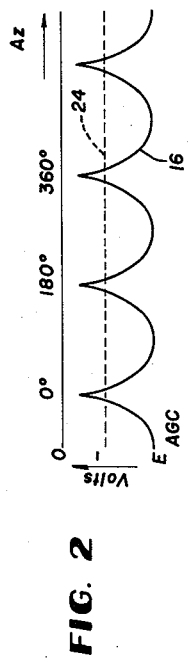
FIGURES 2 through 5 are waveforms useful in understanding the principles of the invention.
Figure 3:
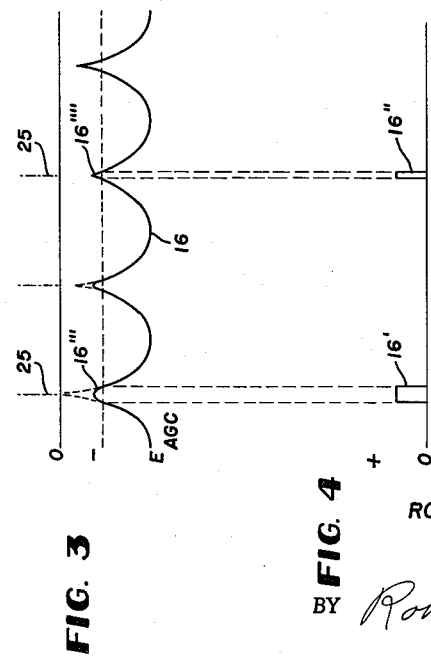

The line 23 on the face of tube 17 traces the azimuth relationship between the transmitter and receiver antennas. If the origin of such line is translated, or more specifically, the origin of the electron beam sweep is translated to coincide with the position of the transmitting antenna, the line will then show the locus of all possible positions of the receiving antenna on the map overlay 28. The may 28 shown in FIGURE 1 is represented in greater detail in FIGURE 6. FIGURE 6 illustrates a map overlay which shows a topographical map which, for example, indicates the terrain features for a location in the area between Boston and New York. Several fixed radio transmitting stations A, B, C, E, are shown, and these are geographically located as represented on the map overlay. With the receiver 10 of the equipment tuned to the frequency of the transmitter B, the position of the receiver is somewhere along a line radiating from the transmitter origin at Boston. However, the origin for the line 23 traced upon the face of tube 17 is at the diametric center of such tube face as shown in FIGURE 1. The sweep origin for the cathode-ray electron beam may be translated my manually off-centering the tube deflection system in accordance with any known method. Thus, for example, the electron beam which traces the locus line by radial deflection may have its initial position translated by means of off-centering controls shown at element 29 of FIGURE 1.

A supplementary deflection system consisting of a magnetic yoke is provided which surrounds the rotating deflection coils 19 on the neck of tube 17. This yoke consists of a plurality of coils mounted on a laminated core. Such coils are so disposed that by varying the current flowing through a first set of coils 31, the spot due to the electron beam when undeflected by coils 19 may be moved horizontally to the left or right. A second set of coils 32 upon the yoke will move the undeflected spot up or down vertically when the current therethrough is varied. The currents through coils 31 and 32 are controlled individually by potentiometers, as indicated by the reference characters V and H within the block 29; the coils and associated potentiometers receive power from a constant voltage source, as indicated in FIGURE 1 by the legend "+HV."

A second off-centering control is provided for the purpose of translating the origin of the electron beam when the receiver 10 is tuned to the frequency of a second fixed station, such as that designated as A, which is shown as being located at Hartford on the terrain may 28 in FIGURE 6. The vertical and horizontal potentiometer controls of the control element 30 are adjusted to place the sweep origin at the transmitter location A shown in FIGURE 6. Thus, the translated sweep lines would appear as viewed through the map overlay 28 in the position shown by the lines 23' and 33 indicated thereon.

When the receiver 10 is tuned to the frequency of the station B at Boston, the position of such receiver carried upon the vehicle which is being navigated is somewhere on the line 23'. In the case when such receiver is carried upon a marine vessel, the location must obviously be along that portion of the line which runs over water, as shown on the map. However, in the case when the vehicle is an aircraft, the position might be anywhere along the line extending from Boston, since the aircraft might be either over the water of Long Island Sound in a direction SW of Boston, or over the land area on either side of the transmitter location B either SW thereof or NE thereof. In order to obviate the above-noted ambiguity of position, and to obtain a definite position "fix," bearing lines from two transmitting station locations are utilized, as is known in the art. In the example shown in FIGURE 6 the position of such second station is that of the transmitter at A in Hartford. The origin of the sweep may be shifted to the position of the station A by the potentiometer controls of element 30, and then back to the origin of station B by the controls of element 29, on a time-sharing arrangement by means of the cam-driven switches 34 and 35 respectively. By rapidly switching from one set of off-center controls to the other, the sweep origin is made to alternate on the map overlay from one transmitter position to the other. Such switching is controlled by a cam wheel 36 which is driven by a 2:1 reduction gear 37 from the drive motor 12. The origin position cam switches 34 and 35 are driven in a particular member in that their movable elements are ganged to the movable element of a third switch 38 which is connected directly to the cam 36.

Switch 38 is provided in order that the tuning of the front end of receiver 10 may be switched alternately to the transmitting frequencies of the two stations A and B. Thus, in the preferred embodiment of the invention, the switching from one transmitter frequency to the other will be performed at the same time that the sweep origin is switched between the respective transmitting stations. Thus, the alternation between the two sweep origins and the related receiving frequencies may be, in the preferred embodiment, at the frequency of sixty alternations per second; with the origin and tuning at A for 1/30 of a second and at B for the next 1/30 of a second, alternating rapidly between the two positions.

Therefore, the direction-finding bearing lines traced upon the map overlay 28 will be as shown in FIGURE 6 by the lines 23' and 33. The receiver location will be at that represented by F at the intersection of such lines.

Since the switching performed by the cam 36 is performed thirty times a second, the resultant position "fix" appears to be a continuous one, and the progress of the vehicle may be observed as it moves about the face of the chart or overlay 28.

The transparent overlay 28 is mounted in front of the face of the cathode-ray tube 17, and it must be directionally stabilized or oriented. This may be done manually if the vehicle maintains a fixed heading for extended periods of time. However, if the vehicle is subject to frequent maneuvering, as particularly in the case of aircraft, it is preferable that the display be automatically oriented. Such orientation may be performed in accordance with various known principles and arrangements. For example, the display may be stabilized or oriented in position wherein either "True North" or the compass bearing of "North" is at the top of the display map, or the map overlay and deflection system be continuously oriented so as to remain in a fixed relative aspect with respect to a fixed axis or heading of the craft or vehicle upon which the system is carried.

In order to stabilize the display with respect to a North reference at the top of the overlay map, a simplified orientation system is included in the embodiment shown in FIGURE 1. A differential gear set 39 is inserted in the mechanical drive system at the point W between drive motor 12 and the deflection coils 19. A servo system including the mechanical linkage W—T—D, a servo motor 40, and the servo amplifier and control element indicated in block 41 is provided. The block element 41 acts to inject a correction angle into the sweep deflection system of the cathode-ray tube display, and such correction angle may be obtained from any suitable reference source as indicated by the block element 42. The reference source indicated at element 42 may be, for example, a directional gyro, a magnetic compass, or other stable element.

In order to orient and stabilize the display system relative to a fixed axis or heading of the vehicle requires additional equipment or elements, as indicated in FIGURE 1, but is to be considered as worthwhile from a standpoint of simplicity of interpretation by the observer, particularly in aircraft applications. Thus, to orient the transparent map overlay 28 relative to an axis or heading of the vehicle, the off-centering yoke and associated coils 31, 32 and the main sweep deflection coil 19 must also be rotated in position in order to keep the display correct with respect to the vehicle upon which the system is carried.

The elements necessary in order to orient the display relative to the vehicle are indicated in FIGURE 1. In addition to the elements 39, 40, 41 and 42 which are provided in order to stabilize the display in the simplified manner in which North is at the top of the map, and including the mechanical interconnection T—D; mechanical interconnections U—O for the off-centering yoke and coils, and T—M for the transparent map overlay are required.

In accordance with the basic principles of the present invention, the arrangement thereof depends upon established radio-direction-finding techniques, and the bearing information derived from the antenna and radio receiver is actually processed by a simplified computing system which involves no complicated mathematical procedures or map-and-plotting techniques, but merely a geometric display system upon the cathode-ray tube and the overlying map. Since such system is based on geometric triangulation, no scale factor or calibration problems are involved. The overlay maps may be of any convenient scale, and the cathode-ray tube screen or face diameter may represent one mile, five miles, 100 miles, or any other convenient distance. The only system requirement is that at least two usable radio transmitting stations may be identified as to their location on the map overlay. The remainder of the map may contain as much of the topographical or terrain features as are desired.

Figure 7:
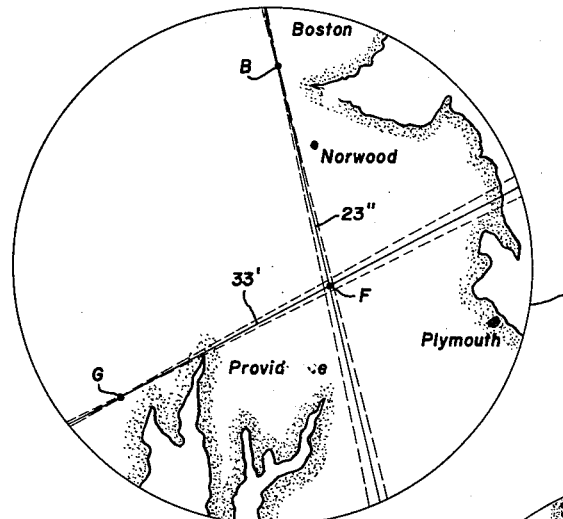
FIGURES 7 through 9 are additional map overlays which may be used with the invention.
Figure 8:
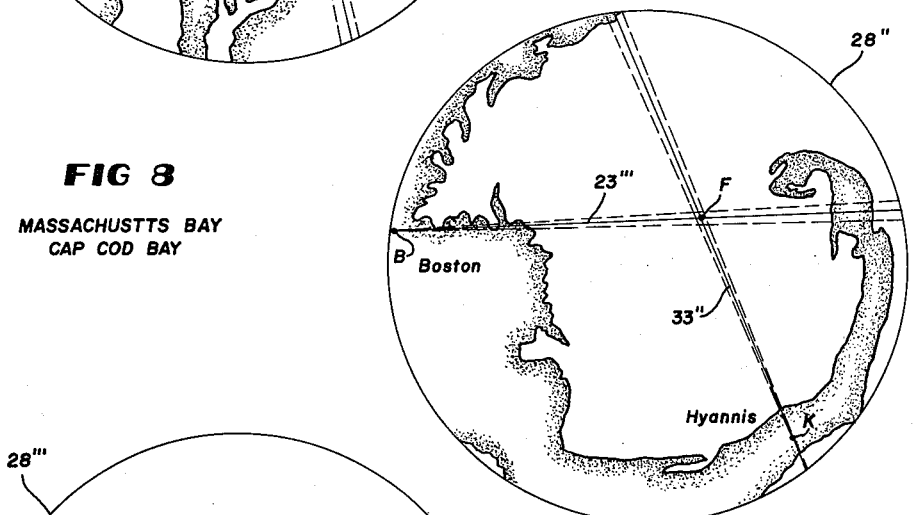
Figure 9:
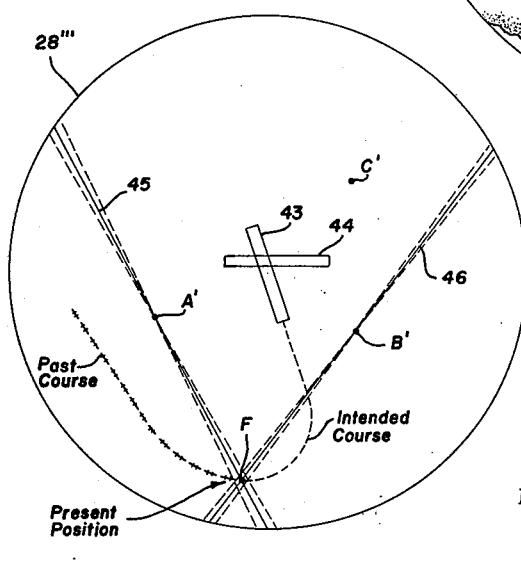

For example, additional map overlays may be as shown in FIGURES 7, 8 and 9.

In FIGURE 7, the map overlay 28' represents a topographical map drawn to a scale larger than that shown in the indication of FIGURE 6. The map 28' in FIGURE 7 may show a portion of the area between Boston and Providence. In such showing, the fixed radio station B is again the transmitter located at Boston and a second radio transmitter G fixed in the Providence area is utilized. The sweep origins will be translated by means of the elements 29 and 30 as before, and the position of the vehicle will be indicated by the "fix" F at the intersection of the two sweep lines 23'' and 33' as viewed through the overlay 28'.

The map overlay 28'' shown in FIGURE 8 is a representation of the area of Massachusetts Bay and Cape Cod Bay. The representation of terrain features are readily apparent in FIGURE 8, and as will be recognized by those skilled in the art, in such a representation the arm of Cape Cod is curved inwardly while the shore-line north of Boston is also curved inwardly due to the PPI presentation in which distances are depicted as measured from a central origin at the center of the face of tube 17. Line 23''' traces the bearing of the vehicle with respect to the fixed transmitter B located at Boston, while bearing line 33'' traces a second indication with respect to a fixed transmitter which may be located as indicated at K at Hyannis. The position of the vehicle is represented by the "fix" F at the intersection of the two bearing lines.

When the equipment of the present invention is utilized for the navigation of aircraft the continuous position plotting feature wherein the intersection of the two bearing lines shows the present location of the craft becomes a distinct advantage. Thus, not only the continuous position fix but the bearing information with respect to the two fixed transmitters are continuously displayed, and the device may be further utilized for a homing function. When terrain maps with fixed scales indicated thereon are utilized, the operator of the aircraft will have in addition to the homing and continuous position fix indication a further indication of his distance from a home transmitter station. Therefore, as shown in the representation of FIGURE 9, by utilizing a sufficiently large map scale and supplementary low-powered fixed ground transmitters, the system of the invention may be used to line an aircraft up with respect to a runway at an airport.

FIGURE 9 shows a map overlay 28''' which, in one embodiment, is drawn to indicate a five mile diameter area about the town of Norwood located south of Boston as shown in FIGURE 7. A plurality of low-powered ground transmitting stations A', B', and C', are provided adjacent the airport runways 43 and 44, and the positions of such transmitters and runways are indicated on the map overlay. Each of such fixed ground transmitting stations may be of a power of 5 watts, and by suitably manipulating the off-centering controls 29 and 30 the pilot of the aircraft may translate the sweep origin to coincide with the locations of the supplemental transmitters A' and B' whereby the map overlay 28''' will continuously indicate the present position of the aircraft by the intersection of the two bearing lines 45 and 46, respectively. Thus, on the map overlay in FIGURE 9, the pilot of the aircraft would be able to continuously monitor the position of the aircraft. The past course of the craft would be that shown by the left portion of the figure wherein the course was traced by the intersection or "fix" F as it moved across the face of the cathode-ray tube. The intended future course of the craft is also indicated in FIGURE 9, which course is to be followed by the pilot in landing the craft upon the runway 43.

A sensitive altimeter on the aircraft utilizing the embodiment represented in FIGURE 9 would be the only other basic instrument required in order to proceed on an approach to a landing on the runways 43 or 44.

The system of the present invention does not require any additional ground radio transmitter installations, with the exception of the modification shown in FIGURE 9, since existing commercial broadcasting stations may be utilized in accordance with the invention. By utilizing such commercial network of radio broadcasting stations, no additional expenditures for special transmitting stations nor any cooperation of existing regulated nationwide radio navigation networks would be required in order to put the system of the invention to immediate use. Certain present fixed radio transmitting stations could be utilized with the invention other than those of the broadcasting networks.

The system of the present invention provides an advantage over the "omni" system since a lower frequency may be used which will obviate the necessity of line-of-sight communications and attendant aircraft flights at higher altitude. Further, there is no necessity for plotting the position of the aircraft upon a supplementary chart, as is necessary when utilizing the direction-finding features of the "omni" system. Automatic information as to position is provided in known prior art arrangements as a supplement to the "omni" system, but this requires the so-called D.M.E. equipment which is complicated and adds weight and power consumption requirements to the over-all system. The D.M.E., although it provides distance along an "omni" radial to an aircraft, further requires the consultation of a supplementary chart in order to determine where such position lies.

It should be understood that although certain preferred embodiments of the invention have been described and specific terms and examples employed, they are used in a generic and descriptive sense and not for purposes of limitation. Various changes and modifications may occur to one skilled in the art without departing from the spirit of the invention; the scope of the invention being set forth in the subjoined claims. FIGURE 9 depicts fixed omnidirectional radio transmitters located adjacent a runway for navigational aid to an aircraft, the system of this form of the invention may obviously be extended to cover any particular area to be navigated by a craft, for example, a harbor or navigatable waterway to be maneuvered by a ship, including submarines, or a terrain to be traversed by a land vehicle; with the selection of appropriate radiant energy sources.

What is claimed is:

1. A radiant energy navigational aid system for a craft comprising, in combination, a direction finder receiver mounted on said craft to determine a first bearing direction from a first radiant energy source to said craft and a second bearing direction from a second radiant energy source to said craft, said receiver including means having a single continuously rotated deflection coil to produce a display covering the area surrounding said craft with the craft's position nominally located at the center thereof and to trace thereon lines indicative of the determined bearing directions from said radiant energy sources, distances from said craft being depicted radially outwardly from the center origin of the display, while azimuth direction is depicted angularly about the central origin, a transparent topographical map overlay showing at least the locations of the radiant energy sources positioned over said display means and orientable with respect thereto and to a reference direction, and means to translate the respective origins of the traced bearing direction lines from the center of said display means to locations lying under their respective topographical representations on said map overlay, whereby the intersection of the converging bearing direction lines establishes the present position of the craft on said map overlay with respect to said plural radiant energy sources.

2. A system according to claim 1 wherein said direction finder receiver includes a directional antenna, drive means to continuously rotate the directional pattern of such antenna in azimuth at a predetermined rate, input switching means to alternately condition the receiver for the reception of radiant energy from said first and second sources, and means coupled to said drive means to actuate said input switching means at a rate related to that of the azimuthal antenna pattern rotation.

3. A system according to claim 2 including further switching means coupled to said drive means to alternately actuate said bearing direction line origin translating means at the same rate and time sequence as that of the receiver input switching means.

4. A radiant energy direction finder arrangement including an energy intercepting transducer having a rotatable directivity pattern, drive means coupled to said transducer to continuously rotate the said directivity pattern at a predetermined rate, tunable energy amplifying and detecting means having an input coupled to said transducer and producing an output voltage whose magnitude varies in proportion to radiant energy received from radiant energy sources, a cathode ray tube display system coupled to said energy detecting means and including at least an electron beam source of controllable energy level, a substantially planar screen illuminable by such beam at a predetermined beam energy level, and deflection means to move said beam linearly across the screen to produce thereon a line, the intensity of such line varying in accordance with the beam energy level such that the line is visible only when said energy is above a predetermined level, further means coupled to said drive means to rotate said deflection means about a central axis normal to said tube screen in synchronism with said transducer directivity pattern to thus position said line in accordance with the directivity pattern of said transducer, trigger means responsive to a predetermined magnitude of the detected energy output voltage to control the beam energy level to raise the intensity of the line to a visible level, switching means for said tunable energy amplifying means to alternatively condition the direction finder for reception of radiant energy from first and second sources, and means to actuate said switching means at a rate related to that of the rotation of said directivity pattern.

5. A radiant energy direction finder arrangement including an energy intercepting transducer having a rotatable directivity pattern, drive means coupled to said transducer to continuously rotate the said directivity pattern at a predetermined rate, tunable energy amplifying and detecting means having an input coupled to said transducer and producing an output voltage whose magnitude varies in proportion to radiant energy received from radiant energy sources, a cathode ray tube display system having at least an input coupled to said energy detecting means and a rotatable deflection means including a single continuously rotated coil coupled to said drive means in synchronism with said transducer directivity pattern to display a visible line, the position of which is indicative of the directivity pattern of said transducer, switching means for said tunable energy amplifying means to alternatively condition the direction finder for reception of radiant energy from first and second sources, and means to actuate said switching means at a rate related to that of the rotation of said directivity pattern.

6. A navigational aid system in accordance with claim 1 wherein said reference direction is north, and compass controlled means to orient said map overlay with respect to such reference direction.

7. A navigational aid system in accordance with claim 1 wherein said reference direction is the present course of the craft, and direction sensing means carried by the craft to orient said map overlay with respect to such reference direction.

8. A system according to claim 1 wherein said means to produce a display includes a cathode ray tube, and said means to translate the origins of the traced bearing direction lines includes auxiliary deflection coils for such tube.

9. A system according to claim 1 wherein said first and second radiant energy sources are low powered transmitters located adjacent a particular area to be navigated by said craft.

10. A system according to claim 8 wherein said reference direction is north, and compass controlled means to angularly rotate said auxiliary deflection coils to orient said display with respect to such reference direction.

11. A system according to claim 8 wherein said reference direction is the present course of the craft, and direction sensing means carried by the craft to angularly rotate said auxiliary deflection coils to orient said display with respect to such reference direction.

12. A radiant energy direction finder arrangement including an energy intercepting transducer having a rotatable directivity pattern, drive means coupled to said transducer to continuously rotate the said directivity pattern at a predetermined rate, tunable energy amplifying and detecting means having an input coupled to said transducer and producing an output voltage whose magnitude varies in proportion to radiant energy received from radiant energy sources, a cathode ray tube display system having at least an input coupled to said energy detecting means and a rotatable deflection means including a single continuously rotated coil coupled to said drive means in synchronism with said transducer directivity pattern to display a visible line, the position of which is indicative of the directivity pattern of said transducer, switching means for said tunable energy amplifying means to alternately condition the direction finder for the reception of radiant energy from first and second sources, and means coupled to said drive means to actuate said switching means at a rate related to that of the cyclic transducer directivity pattern rotation.

13. A radiant energy direction finder arrangement including an energy intercepting transducer having a rotatable directivity pattern, drive means coupled to said transducer to continuously rotate the said directivity pattern at a predetermined rate, tunable energy amplifying and detecting means having an input coupled to said transducer and producing an output voltage whose magnitude varies in proportion to radiant energy received from radiant energy sources, a cathode ray tube display system having at least an input coupled to said energy detecting means and a rotatable deflection means including a single continuously rotated coil coupled to said drive means in synchronism with said transducer directivity pattern to display a visible line, the position of which is indicative of the directivity pattern of said transducer, switching means for said tunable energy amplifying means to alternately condition the direction finder for the reception of radiant energy from first and second sources, means coupled to said drive means to actuate said switching means at a rate related to that of the cyclic transducer directivity pattern rotation, and further switching means for said cathode ray tube deflection means to alternately displace the lines traced upon such tube at the same rate and time sequence as that of the first-mentioned tunable switching means.

14. A radiant energy direction finder arrangement including an energy intercepting transducer having a rotatable directivity pattern, drive means coupled to said transducer to continuously rotate the said directivity pattern at a predetermined rate, tunable energy amplifying and detecting means having an input coupled to said transducer and producing an output voltage whose magnitude varies in proportion to radiant energy received from radiant energy sources, a cathode ray tube display system having at least an input coupled to said energy detecting means and a rotatable deflection means including a single continuously rotated coil coupled to said drive means in synchronism with said transducer directivity pattern to display a visible line, the position of which is indicative of the directivity pattern of said transducer, switching means for said tunable energy amplifying means to alternately condition the direction finder for the reception of radiant energy from first and second sources, means coupled to said drive means to actuate said switching means at a rate related to that of the cyclic transducer directivity pattern rotation, further switching means for said cathode ray tube deflection means to alternately displace the lines traced upon such tube at the same rate and time sequence as that of the first-mentioned tunable switching means, a transparent topographical map overlay showing at least the locations of said radiant energy sources positionable over said display means and orientable with respect thereto, and said traced line translating means being operable to position the respective bearing direction lines at locations lying under their respective topographical representations on said map overlay.

15. A radiant energy direction finder arrangement including an energy intercepting transducer having a rotatable directivity pattern, drive means coupled to said transducer to continuously rotate the said directivity pattern at a predetermined rate, tunable energy amplifying and detecting means having an input coupled to said transducer and producing an output voltage whose magnitude varies in proportion to radiant energy received from radiant energy sources, a cathode ray tube display system coupled to said energy detecting means and including at least an electron beam source of controllable energy level, a substantially planar screen illuminable by such beam at a predetermined beam energy level, and deflection means to move said beam linearly across the screen to produce thereon a line, the intensity of such line varying in accordance with the beam energy level such that the line is visible only when said energy is above a predetermined level, further means coupled to said drive means to rotate said deflection means about a central axis normal to said tube screen in synchronism with said transducer directivity pattern to thus position said line in accordance with the directivity pattern of said transducer, trigger means responsive to a predetermined magnitude of the detected energy output voltage to control the beam energy level to raise the intensity of the line to a visible level, and a transparent topographical map overlay showing at least the locations of the radiant energy sources positioned over said display means and orientable with respect thereto and to a reference direction.

16. A radiant energy direction finder arrangement including an energy intercepting transducer having a rotatable directivity pattern, drive means coupled to said transducer to continuously rotate the said directivity pattern at a predetermined rate, tunable energy amplifying and detecting means having an input coupled to said transducer and producing an output voltage whose magnitude varies in proportion to radiant energy received from radiant energy sources, a cathode ray tube display system having at least an input coupled to said energy detecting means and a rotatable deflection means including a single continuously rotated coil coupled to said drive means in synchronism with said transducer directivity pattern to display a visible line, the position of which is indicative of the directivity pattern of said transducer, and a transparent topographical map overlay showing at least the locations of the radiant energy sources positioned over said display means and orientable with respect thereto and to a reference direction.

References Cited in the file of this patent

UNITED STATES PATENTS

| | | |
|---|---|---|
| 2,209,191 | Dearing | July 23, 1940 |
| 2,364,731 | Luck | Dec. 12, 1944 |
| 2,380,929 | Ahier et al. | Aug. 7, 1945 |
| 2,465,350 | Burroughs | Mar. 29, 1949 |
| 2,489,251 | Annast | Nov. 29, 1949 |